United States Patent
Marzy

[15] 3,670,608
[45] June 20, 1972

[54] MULTIPLE TOOL HOLDER DEVICE
[72] Inventor: Otto Marzy, Steyr, Austria
[73] Assignee: Georg Fischer Aktiengesellschaft, Schaffhausen, Switzerland
[22] Filed: March 31, 1970
[21] Appl. No.: 24,141

[30] Foreign Application Priority Data
   April 7, 1969   Switzerland .......................... 5250/69

[52] U.S. Cl. .......................................... 82/36 A
[51] Int. Cl. ...................................... B23b 29/24
[58] Field of Search ...................... 82/36, 36 A, 37

[56] References Cited
   UNITED STATES PATENTS
   946,989   1/1910   Steinle ...................... 82/36 A
   FOREIGN PATENTS OR APPLICATIONS
   1,179,134   1/1970   Great Britain ............. 82/36
   400,147   11/1942   Italy .......................... 82/36

Primary Examiner—Leonidas Vlachos
Attorney—Werner W. Kleeman

[57] ABSTRACT

A multiple tool holder for a machine tool, especially a lathe, comprising a tool holder body member having a number of tool receiving stations at least some of which are arranged in neighboring pairs. Respective axially displaceable and radially displaceable clamping elements are provided for each neighboring pair of tool receiving stations, which respective clamping elements are mounted at the tool holder body member. A common clamping mechanism is provided for the respective axially displaceable and radially displaceable clamping elements of each neighboring pair of tool receiving stations, and a single eccentric bolt means is rotatably mounted at the tool holder body member for actuating each such common clamping mechanism.

6 Claims, 3 Drawing Figures

INVENTOR
OTTO MARZY

BY Werner W. Kleeman
ATTORNEY

MULTIPLE TOOL HOLDER DEVICE

BACKGROUND OF THE INVENTION

The present invention relates to a new and improved multiple tool holder for a machine tool, especially a lathe, which is of the type incorporating a plurality of tool receiving stations arranged at a tool holder body member, wherein a respective clamping element which can be eccentrically actuated is displaceably mounted in the tool holder body member and associated with each such tool receiving station.

A multiple tool holder of the above-mentioned general type is already known to the art. However, this prior art apparatus possesses the drawback that the clamping element for fixedly clamping the tool support and consisting of tension-and eccentric bolt means cannot be fixedly arranged in the multiple tool holder, rather must be inserted each time in such multiple tool holder. Furthermore, a change from a radial arrangement into an axial arrangement, and visa versa, requires that each time there is undertaken a change in the arrangement of the clamping element, which, in turn, is likewise very cumbersome.

Other arrangements for fixedly clamping tool holders are also known to the art, yet the elements thereof require so much space that the simultaneous accommodation or application of a number of radial and axial receiving stations at a multiple tool holder is too complicated, if not in fact impossible.

SUMMARY OF THE INVENTION

Accordingly, it is a primary objective of the present invention to provide a new and improved multiple tool holder which effectively overcomes the aforementioned drawbacks of the prior art constructions.

Still another more specific object of the present invention relates to an improved multiple tool holder having novel mechanism for effectively clamping the tool elements at each tool receiving station in a quick, positive and reliable fashion, with a minimum of effort and wherein there is afforded a compact unit which does not require too much space.

Now, in order to implement these and still further objects of the invention, which will become more readily apparent as the description proceeds, the inventive multiple tool holder is manifested by the features that neighboring pairs of tool receiving stations equipped with a respective axially displaceable clamping element and a radially displaceable clamping element are provided with a common clamping mechanism which can be actuated by a single eccentric bolt means which is rotatably mounted in the tool holder body member.

According to another aspect of the invention the eccentric bolt means is mounted in radial direction far towards the outside at the tool holder body member. To allow for such arrangement it is advantageous if this eccentric bolt member is operably connected with one clamping element through the agency of a single arm tiltable or pivotable lever.

BRIEF DESCRIPTION OF THE DRAWINGS

The invention will be better understood and objects other than those set forth above, will become apparent, when consideration is given to the following detailed description thereof. Such description makes reference to the annexed drawings wherein.

DETAILED DESCRIPTION OF THE PREFERRED EMBODIMENTS

Figure 1:
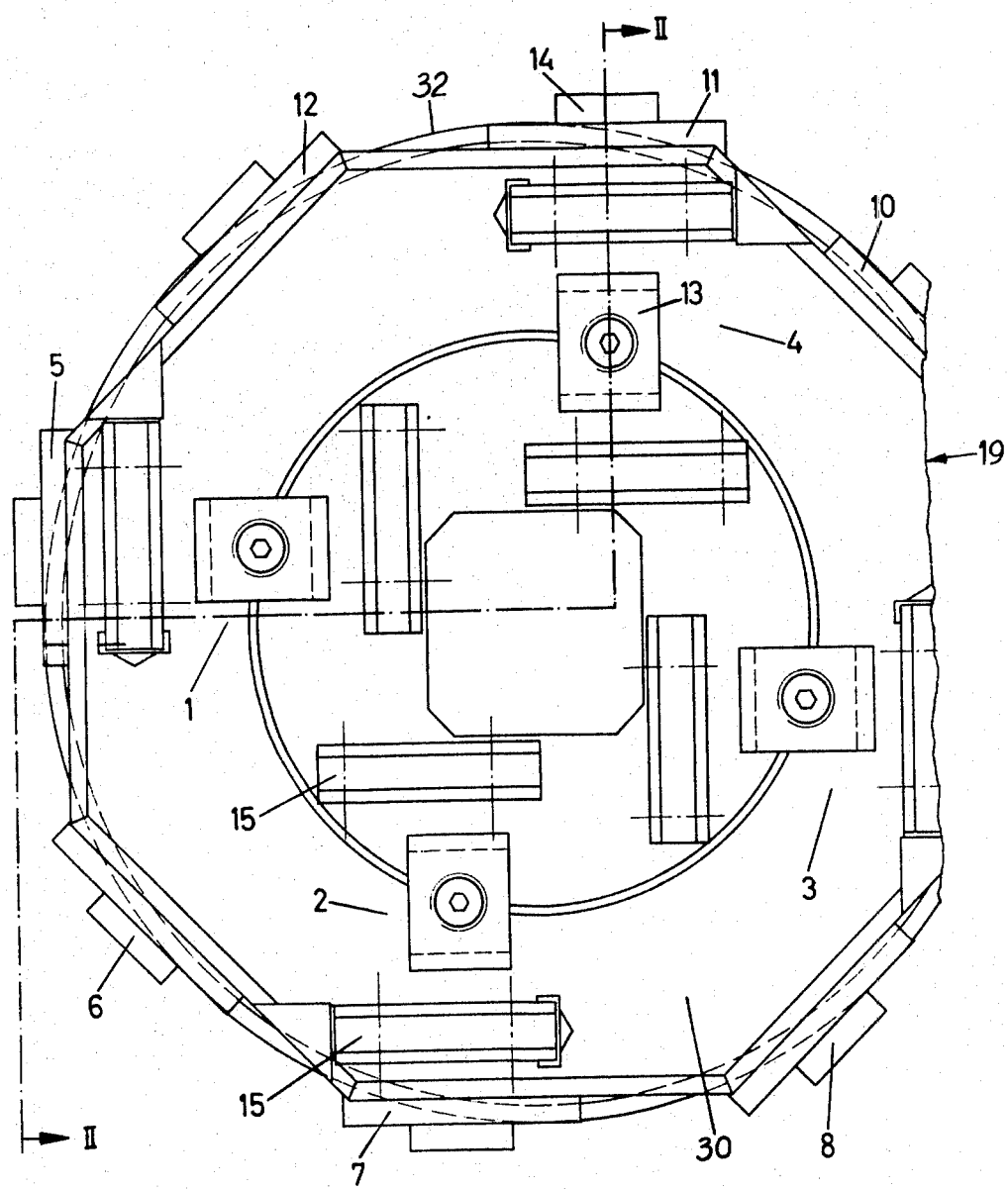
FIG. 1 is a front view of a first exemplary embodiment of inventive multiple tool holder.

Describing now the drawings, as will be observed by referring to FIG. 1 the therein exemplary illustrated embodiment of multiple tool holder will be seen to comprise a tool holder body member 19 provided at one of its end opposed end faces 30 with four tool receiving stations or locations 1–4 and along its periphery or circumferentially extending portion 32 with eight tool receiving stations or locations 5–12 inclusive. The pairs of tool receiving stations 1 and 5, 2 and 7, 3 and 9, 4 and 11, are each provided with a common clamping mechanism as such has been depicted in greater detail in FIG. 2. More specifically, each such common clamping mechanism will be seen to incorporate a clamping element 13 working upon the end face 30 of the tool holder and a clamping element 14 acting upon the periphery or circumferentially extending portion 32 of the tool holder. Each clamping element 13 and 14 is equipped with two respective guide ledges 15 for the exact guiding of the tool holder or support 17 provided with a suitable tool 16. Each clamping mechanism cooperates with an eccentric bolt means 18 which is mounted in the tool holder body member 19 at the region of its periphery 32 and with the aid of a suitable socket wrench, or other appropriate tool, is rotatable in order to actuate both of the clamping elements 13 and 14 belonging to such clamping mechanism.

Figure 2:
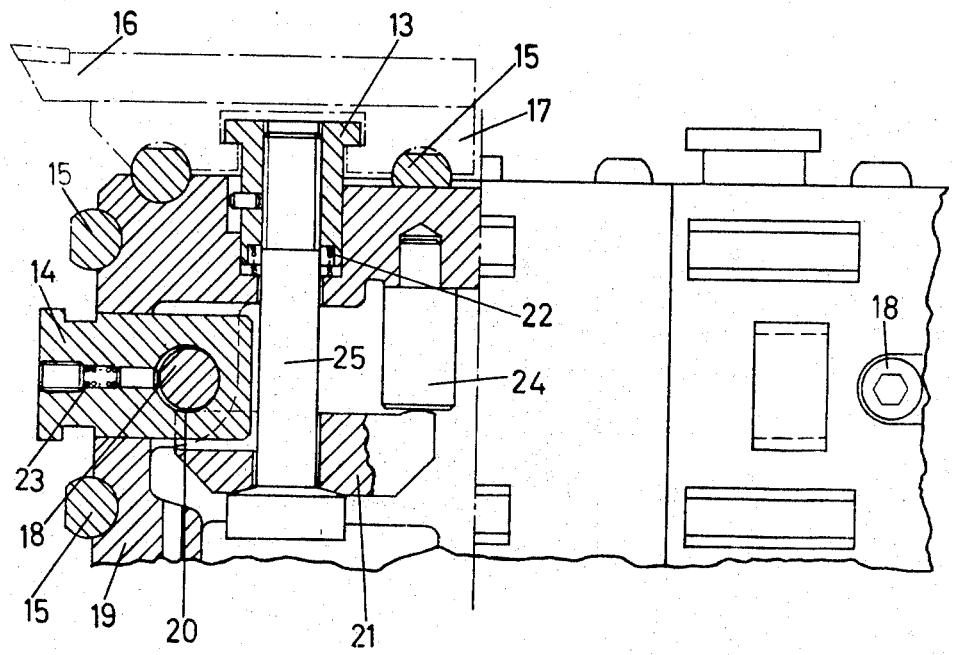
FIG. 2 is a cross-sectional view of the multiple tool holder depicted in FIG. 1, taken along the line II—II thereof and turned through 90°.

As will be further observed by inspecting FIG. 2, each clamping mechanism embodies a radially displaceable clamping element, in this case clamping element 14, and an axially displaceable clamping element, namely clamping element 13, wherein the clamping element 14 will be seen to have a bore member 20 for receiving the eccentric bolt means 18. Furthermore, bearing against the eccentric portion of the bolt means 18 is one end of a single-arm pivotable or tiltable lever member 21, the other end of which bears against a stop member 24 and which additionally acts via a tension rod 25 upon the axially displaceable clamping element 13. By virtue of this arrangement and by means of the pivotable lever 21, it is possible to arrange the eccentric bolt means 18 in radial direction far to the outside, that is to say, offset with respect to the clamping element 13.

The bore 20 for receiving the eccentric bolt means 18 corresponds to the circular-shaped enveloping curve or contour of the eccentric movement upon rotating the bolt means 18. Additionally, pressure springs 22 and 23 are provided in order to press the clamping elements 13 and 14, respectively, in axial and radial direction, respectively, towards the outside. In this manner it is possible to actuate two different clamping elements 13 and 14 with a single eccentric bolt member or means 18.

Figure 3:
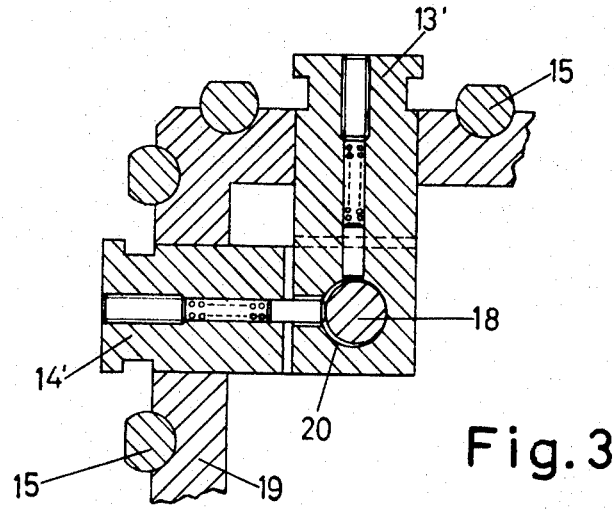
FIG. 3 is a fragmentary view of a portion of a second embodiment of the inventive multiple tool holder.

In the variant construction of inventive multiple tool holder mechanism as depicted in FIG. 3, it is also possible to equip both clamping elements 13' and 14' with a respective bore 20 for directly receiving the eccentric bolt member or means 18. In contrast to the arrangement depicted in FIGS. 1 and 2, this solution possesses the advantage that the construction is simpler, however with this particular arrangement it is not possible to mount the eccentric bolt member 18 in radial direction externally of the axially displaceable clamping element in the tool holder body member 19.

While there is shown and described present preferred embodiments of the invention, it is to be distinctly understood that the invention is not limited thereto but may be otherwise variously embodied and practiced within the scope of the following claims.

What is claimed is:

1. A multiple tool holder for a machine tool, especially a lathe, comprising a tool holder body member having a circumferentially extending portion and oppositely situated end faces, a number of tool receiving stations provided for said tool holder body member, said number of tool receiving stations being disposed in spaced relationship about said circumferentially extending portion and at least one of said end faces, at least some of said tool receiving stations being arranged in neighboring pairs, wherein one such tool receiving station of each pair is disposed at the circumferentially extending portion and the other tool receiving station of the same pair at said one end face of said tool holder body member, a common clamping mechanism provided for each such neighboring pair of tool receiving stations, said common clamping mechanism embodying a respective axially displaceable clamping element and a radially displaceable clamping element for each neighboring pair of tool receiving stations, said clamping elements being displaceably mounted at said tool holder body member, a single eccentric bolt means for each common clamping mechanism rotatably mounted at said tool holder body member for actuating the associated common clamping mechanism, said single eccentric bolt means being arranged at the region of said circumferentially extending portion of said tool holder body member.

2. A multiple tool holder for a machine tool as defined in claim 1, wherein one of said clamping elements is provided with a bore, said eccentric bolt means being mounted in said bore, and a single-arm pivotable lever member for operatively connecting said eccentric bolt means with the other clamping element.

3. A multiple tool holder for a machine tool as defined in claim 1, wherein each axially and radially displaceable clamping element of said neighboring pair of tool receiving stations is provided with a respective bore, said eccentric bolt means being mounted in and piercingly extending through said respective bores of said clamping elements of said neighboring pair of tool receiving stations.

4. A multiple tool holder for a machine tool as defined in claim 2, wherein said bore for receiving said eccentric bolt means substantially corresponds to the circular-shaped enveloping curve of the eccentric movement of said eccentric bolt means, and spring means for pressing said respective axially displaceable clamping element and radially displaceable clamping element of each neighboring pair of tool receiving stations in axial and radial direction, respectively, towards the outside.

5. A multiple tool holder for a machine tool as defined in claim 3, wherein said bores for receiving said eccentric bolt means possess a configuration substantially corresponding to the circular-shaped enveloping curve of the eccentric movement of said eccentric bolt means, and spring means for displacing said respective axially displaceable clamping element and radially displaceable clamping element of each neighboring pair of tool receiving stations in axial and radial direction, respectively, towards the outside.

6. A multiple tool holder for a machine tool as defined in claim 1, wherein said single eccentric bolt means is located between two neighboring tool receiving stations arranged at said circumferentially extending portion.

* * * * *